United States Patent
Suter et al.

(10) Patent No.: US 7,004,448 B2
(45) Date of Patent: Feb. 28, 2006

(54) TRIM INSERT FOR CHOKE ASSEMBLY

(75) Inventors: Roger Suter, Katy, TX (US);
Burkhard Alan, Houston, TX (US)

(73) Assignee: M-I LLC, Houston, TX (US)

( * ) Notice: Subject to any disclaimer, the term of this patent is extended or adjusted under 35 U.S.C. 154(b) by 0 days.

(21) Appl. No.: 10/894,267

(22) Filed: Jul. 19, 2004

(65) Prior Publication Data

US 2006/0011877 A1    Jan. 19, 2006

(51) Int. Cl.
*F16K 51/00* (2006.01)
(52) U.S. Cl. ............... 251/122; 137/375; 251/360
(58) Field of Classification Search .......... 251/120, 251/121, 122, 123, 360, 368; 137/375
See application file for complete search history.

(56) References Cited

U.S. PATENT DOCUMENTS

| | | | |
|---|---|---|---|
| 4,337,788 A | 7/1982 | Seger | |
| 4,355,784 A * | 10/1982 | Cain | 251/121 |
| 4,503,878 A | 3/1985 | Taylor | |
| 4,732,364 A * | 3/1988 | Seger et al. | 251/122 |
| 4,735,229 A * | 4/1988 | Lancaster | 137/375 |
| 5,133,383 A * | 7/1992 | King | 251/121 |
| 5,201,491 A * | 4/1993 | Domangue | 251/122 |
| 6,253,787 B1 * | 7/2001 | Suter et al. | 251/47 |
| 6,446,664 B1 | 9/2002 | Parsons | |

* cited by examiner

*Primary Examiner*—John Bastianelli
(74) *Attorney, Agent, or Firm*—M-I LLC

(57) ABSTRACT

A trim insert for a choke assembly is disclosed, wherein the trim insert is a tubular member with a substantially constant inner diameter. A first end of the device is positioned within an adjacent upstream sleeve and a second end is sealingly retained within the discharge channel of the choke assembly. A flange coaxially retains the tubular member between the sleeve and a shoulder of the choke body. The trim insert is made of an erosion resistant material, such as tungsten carbide, hardened steel, or a ceramic. Additionally, the inner surface of the tubular member may be coated with a hardening compound to provide additional erosion resistance.

19 Claims, 3 Drawing Sheets

TRIM INSERT FOR CHOKE ASSEMBLY

BACKGROUND OF INVENTION

Choke assemblies are used to help regulate the pressure within a well as it is being drilled and stimulated. During such drilling, and particularly during stimulation, high pressure gases and drilling fluids may blow through the choke assembly, bringing sand and other debris which erode the interior of the choke assembly.

Replaceable inserts have been used to line the interior components of the body of the choke assembly and to function as a choke seat. Such inserts are often made of an erosion-resistant material, such as tungsten carbide and some are further lined with an additional erosion-resistant material or tiles. Many prior art inserts are retained within the choke assembly by a snap ring or other separate attachment devices, such as pins. A separate valve seat may be retained within the insert. Often, the high velocity fluids erode the retention components, requiring that the snap rings or pins be replaced and the snap ring retention grooves reformed into the choke interior. This causes additional material and labor costs to repair the choke assembly, as well as losing use of the choke assembly during the time required to make such repairs. Additionally, the retention ring or pin may not fit properly within the refurbished groove or receptacle, thereby causing additional repair time.

Other prior art trim inserts are retained within the choke assembly by a threaded interface between the trim insert and the discharge channel of the choke assembly. Small particles and drilling fluid can accumulate between the trim insert and the choke assembly, including the small area between the threads. This accumulation can cause the threads to erode as well as increase the difficulty of removing the trim insert.

Other prior art replaceable trim inserts have included a flange that positions the trim device within the choke outlet channel. However, the seat against which the valve rested to stop flow through the choke has been a separate device that fit within the trim device.

A As fewer components results in less downtime and fewer problems with assembly of the components, it would be an improvement to the art to have a replaceable insert that is retained within the choke assembly without the use of additional pieces, such as snap rings or pins. It would be a further improvement to the art to incorporate the seat for the valve, or shuttle as it is also called, into the trim component to result in a single piece that may be retained within the choke assembly and provide a seat for the shuttle.

SUMMARY

The claimed trim insert includes a tubular member having a first end positioned within the upper body section of a choke body and a second end sealingly retained within the discharge channel of the choke body. The first end of the trim device has a first end outer diameter sufficient to fit within the second end of a longitudinally adjacent sleeve retained within the upper body orifice of the upper body section. The second end outer diameter is sufficient to fit within the discharge channel and simultaneously retain an adjacent trim component in a downstream position. A flange between the first and second ends of the tubular member has an outer diameter sufficient to fit within the upper body orifice and sufficient to retain the tubular member between the second sleeve end and a shoulder formed in the choke body at the junction of the upper body section and the discharge channel.

The trim insert may be made from an erosion resistant material such as tungsten carbide, hardened steel, stainless steel or ceramic. A coating may be adhered to the surface of the tubular member to further resist erosion.

Also inclusive with the present invention is a method of assembling a choke assembly with protective trim in the upper body orifice and discharge channel. The steps include inserting at least one downstream trim component and the trim insert into the discharge channel of the choke body, inserting a sleeve insert into the upper body orifice, assembling a shuttle subassembly to a bonnet, inserting the shuttle of the shuttle subassembly into the upper body orifice, placing the bonnet over the choke body and attaching it to the choke body. The trim devices may be periodically monitored and replaced when damage is detected.

These and other features of the present invention are more fully set forth in the following description.

DETAILED DESCRIPTION

Figure 1:
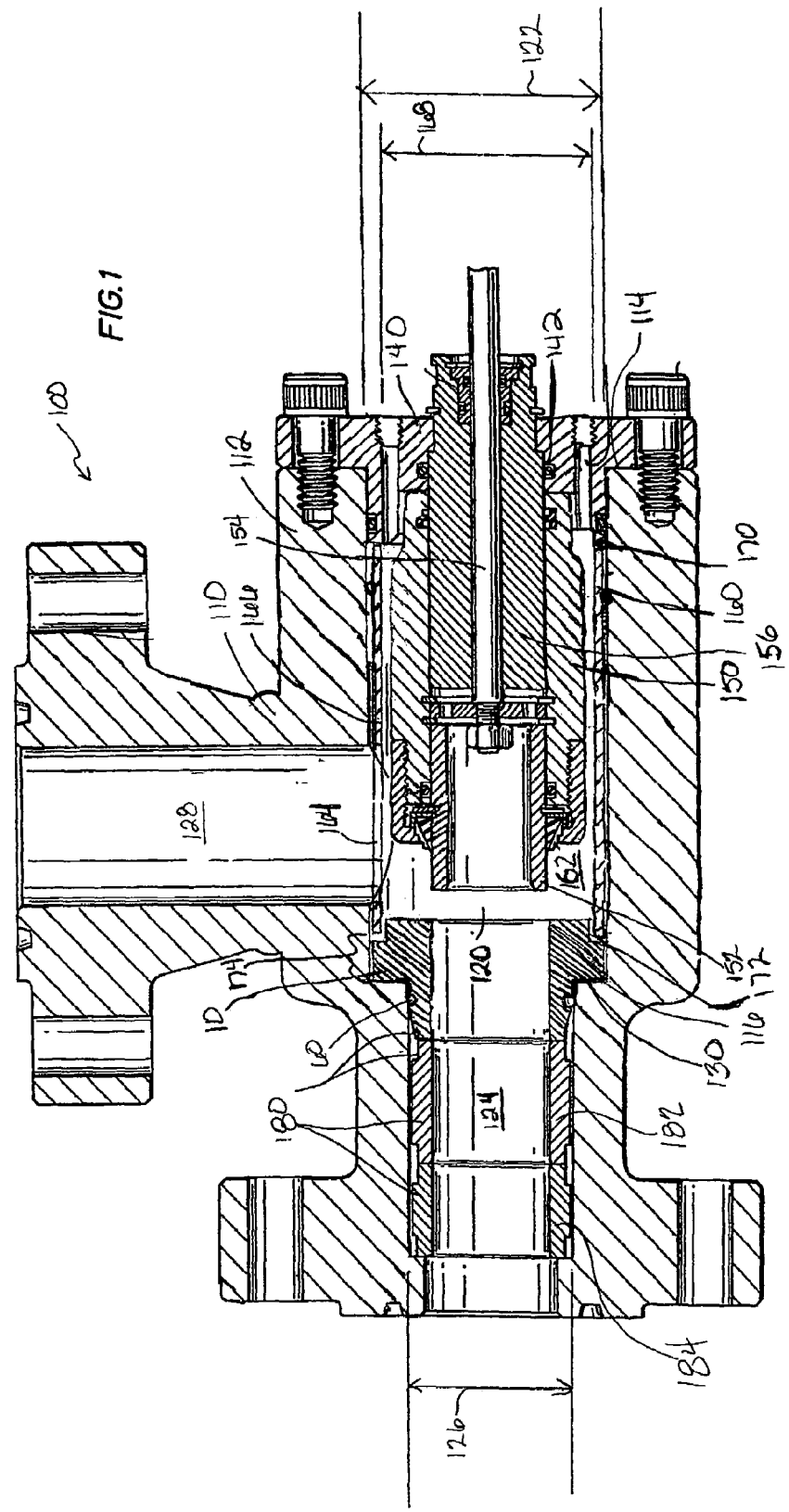
FIG. 1 is a cross-sectional view of a choke assembly with the inventive trim insert.

The present invention is directed to a trim insert for a choke assembly. Referring to FIG. 1, a choke assembly 100 is depicted with the inventive trim insert 10. The choke assembly 100 includes a choke body 110, a bonnet 140, a shuttle subassembly 150, a sleeve insert 160, and downstream trim components 180.

The choke body 110 includes an upper body section 112, a discharge channel 124 and an inlet channel 128. An upper body orifice 120 extends through the length of the upper body section 112. The inlet channel 128 feeds into a side of upper body orifice 120 between an upper body first end 114 and an upper body second end 116. The discharge channel 124 is coaxially aligned with the upper body orifice 120 and adjoins upper body second end 116. The downstream trim components 180 are retained within the discharge channel 124.

The upper body orifice 120 has an orifice diameter 122 and the discharge channel 124 has a channel diameter 126. The orifice diameter 122 is larger than the channel diameter 126, thereby forming a shoulder 130 at the upper body second end 116.

Continuing to refer to FIG. 1, the sleeve insert 160 is sealingly retained within the upper body orifice 120. The sleeve 160 has a sleeve orifice 162 through its length with a sleeve inner diameter 168. An opening 164 in the sleeve wall 166 provides fluid communication from the inlet channel 128 to the sleeve orifice 162. A sleeve first end 170 is located near upper body first end 114 and sleeve second end 172 is located near upper body second end 116. A gap 174 is present between sleeve second end 172 and shoulder 130.

The bonnet 140 fits over upper body first end 114. A mandrel 156 extends from the bonnet 140 into the upper body orifice 120. A mandrel orifice 142 extends through the bonnet 140 and integrated mandrel 156. The bonnet 140 is attachable to the upper body first end 114.

The shuttle subassembly 150 includes a shuttle 152 and a rod 154. The rod 154 and shuttle 152 are longitudinally linearly displaceable within the sleeve orifice 162. The shuttle 152 moves along the outside of the mandrel 156 while the rod 154 is positioned through the mandrel orifice 142. The shuttle 152 may be positioned such that flow is stopped through the choke body 110.

Figure 2:
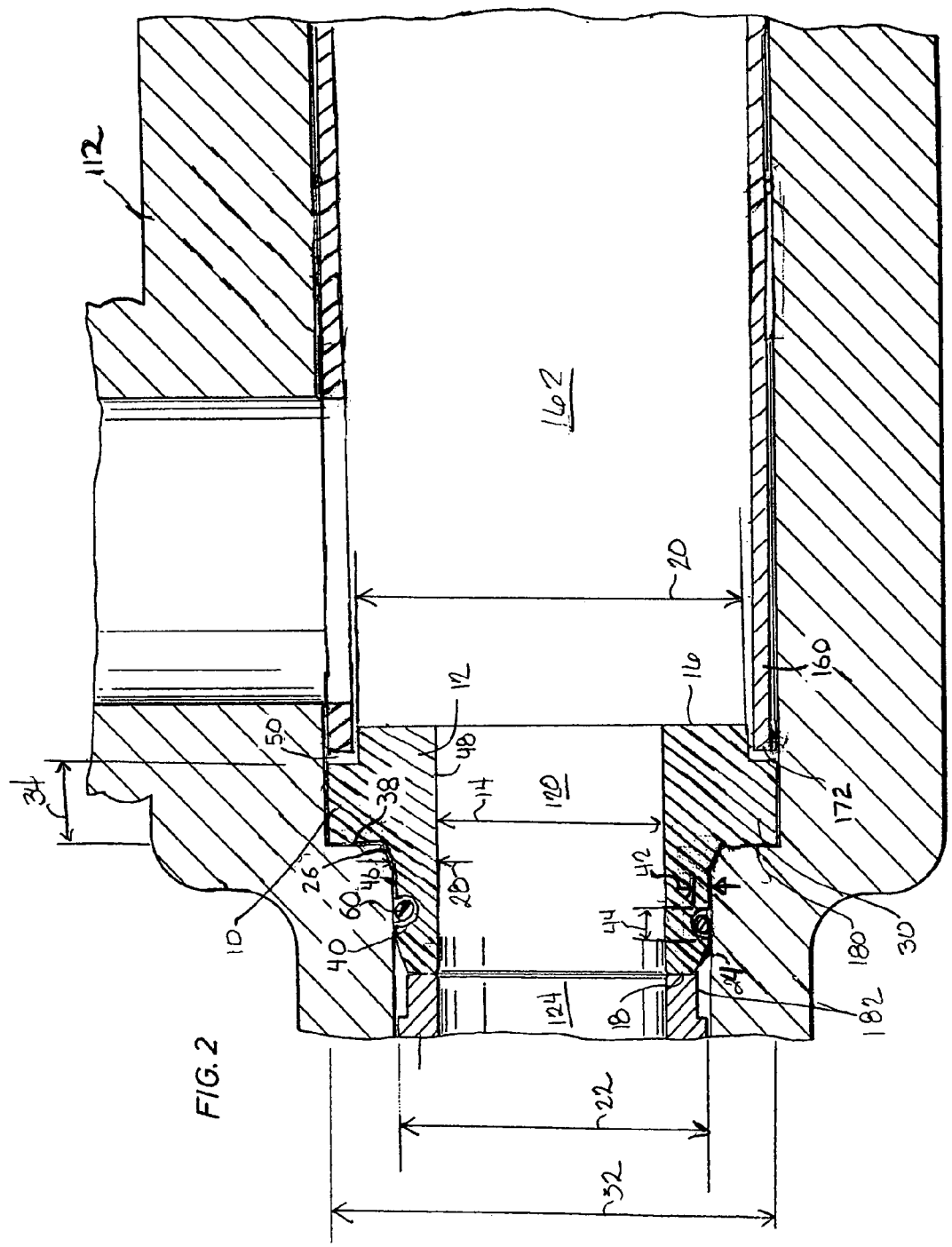
FIG. 2 is a cross-sectional partial view of a first embodiment of the trim insert installed in the choke assembly.
Figure 3:
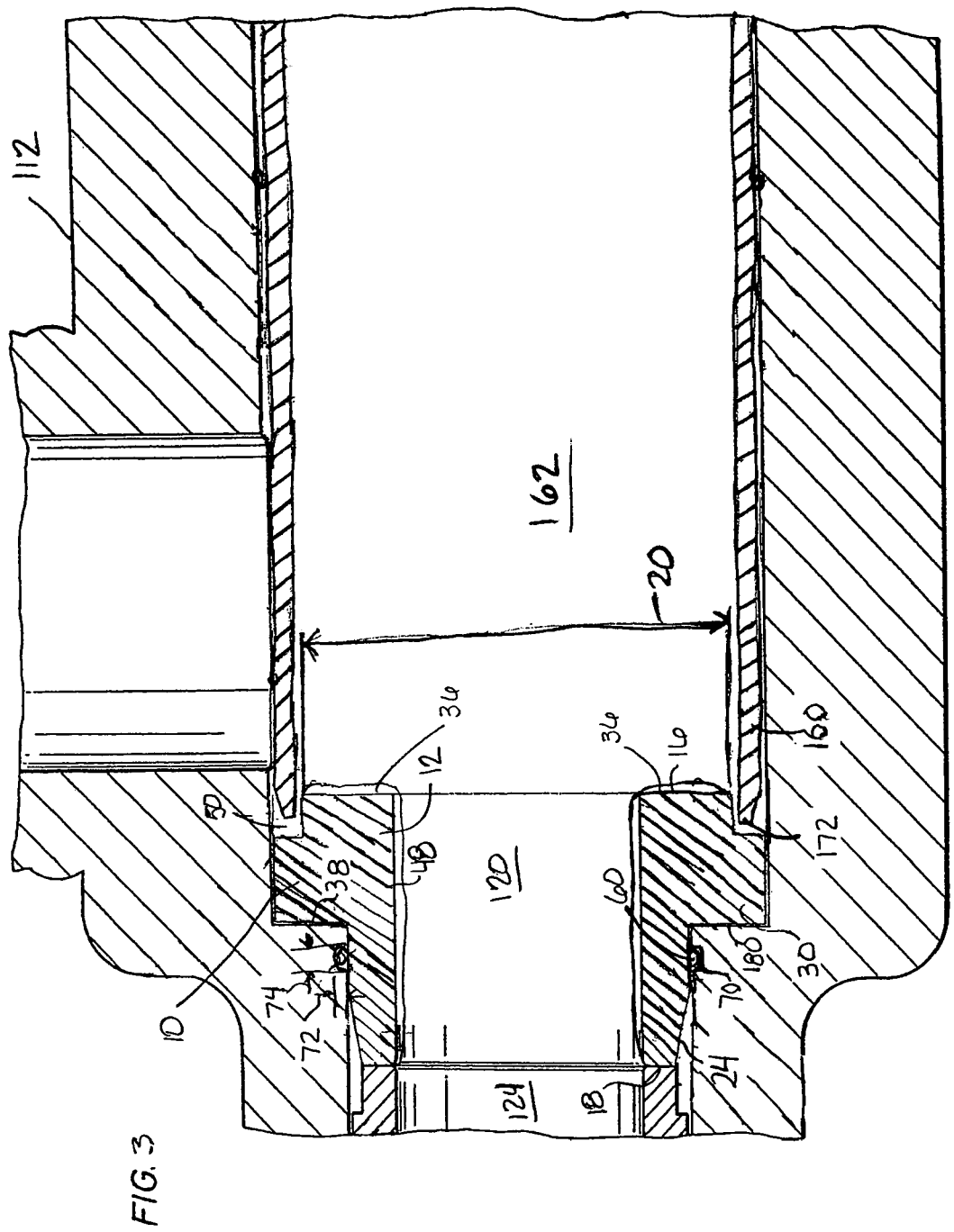
FIG. 3 is a cross-sectional partial view of an alternative embodiment of the trim insert installed in the choke assembly.

Referring to FIGS. 2 and 3, the trim insert 10 includes a tubular member 12. Although depicted with a substantially constant inner diameter 14, the inner diameter 14 may vary along the length of the tubular member 12.

A first end 16 of the tubular member 12 is positioned within the upper body section 112, and more specifically within the sleeve insert 160. The first end outer diameter 20 is sufficient to fit within the sleeve second end 172.

The first end 16 of the tubular member 12 may interface with shuttle 152. Thus, the profile of first end 16, including the inner diameter 14 near the first end, must be appropriately shaped and sized to accommodate the shuttle 152 when the shuttle 152 is in a position to stop flow through the choke body 110.

Continuing to refer to FIGS. 2 and 3, a second end 18 of the tubular member 12 is sealingly retained within the discharge channel 124. The second end outer diameter 22 of tubular member 12 is sufficient to fit within discharge channel 124 and, also, to retain an adjacent downstream trim component 182 in a downstream position.

A flange 30 is located intermediate the first end 16 and second end 18 of tubular member 12. The flange 30 has a flange outer diameter 32 sufficient to fit within the upper body orifice 120 while being longitudinally retained between the sleeve second end 172 and the shoulder 130. The flange thickness 34 is sufficient to prevent shearing of the flange 30 when pressure is exerted on the tubular member 12 by the closed shuttle assembly 150. Further, when a flange second surface 38 is against shoulder 130, flange first surface 36, located on the opposing side of the flange 30, should not contact sleeve second end 172. Rather, a small gap 50 should exist between the sleeve insert 160 and the flange 30.

A flange reinforcement section 26 may be included immediately adjacent the flange and extending from the flange 30 toward the second end 18. In the area of the flange reinforcement section 26, the wall thickness 28 is thicker between the inner surface 48 and the outer surface 46 immediately adjacent flange 30 and becomes thinner in the direction of second end 18. The flange reinforcement section 26 provides increased shear resistance and strength to the flange 30, particularly when the shuttle 152 is in a closed position.

Referring to FIGS. 1–3, a sealing ring 60 centers tubular member 12 within discharge channel 124 as well as providing a sealed interface between the upper body orifice 120 and discharge channel 124. Referring to FIG. 2, in one embodiment, a circumferential groove 40 is present around the outer surface 46 of tubular member 12 between the flange 30 and the second end 18. The circumferential groove 40 has a groove depth 42 and a groove width 44 sufficient to accommodate the seal ring 60 within it.

Referring to FIG. 3, in another embodiment, an annular groove 70 is formed into the discharge chamber 124. The annular groove 70 has a groove depth 72 and groove width 74 to accommodate a seal ring 60.

Referring to FIGS. 2 and 3, the outer surface 46 of tubular member 12 may have a tapered section 24 near the second end 18. The tapered section 24 at the second end 18 aids in the insertion of the tubular member 12 into the discharge channel 124.

The trim insert 10 should be made from a hardened, erosion resistant material, such as tungsten carbide, stainless steel, or hardened steel. It is also conceivable that a ceramic material or composite alloy material may be suitable for forming the trim insert 10. The tubular member 12 may be coated with a wear-resistant coating 36 (shown in FIG. 3) to slow the erosion process.

Referring to FIG. 1, to protect the discharge channel 124 from excessive wear, downstream trim devices 180 are inserted through the upper body orifice 120 and seated within the discharge channel 124, with upstream trim devices resting against adjacent downstream trim devices. The trim insert 10 is inserted through the upper body orifice 120 to the upper body second end 116, where the second end 18 of the tubular member 12 is sealed with a sealing ring 60 within the discharge channel 124. The flange 30 may rest against the shoulder 130. The sleeve insert 160 is inserted into the upper body orifice 120 and oriented such that the opening 164 in the sleeve wall 166 is aligned with the inlet channel 128. The shuttle subassembly 150 is assembled to a bonnet 140. The bonnet 140 is placed over the upper body section 112, with the rod 154 of the shuttle assembly 150 placed through the mandrel orifice 142 in the bonnet 140 and the shuttle 152 lowered into the sleeve orifice 162. The bonnet 140 is attached to the upper body section 112.

Periodically, the sleeve insert 160, trim insert 10, and downstream trim devices 180 are monitored to detect whether damage has been incurred. When a predetermined amount of damage has been observed or after a predetermined length of time, the bonnet 140 and shuttle assembly 150 are removed and the damaged component is replaced. The bonnet 140 and shuttle assembly 150 are repositioned over the upper body section 112 and the bonnet 140 is reattached to the upper body section 112.

It is understood that variations may be made in the foregoing without departing from the scope of the invention. For example, the present invention is not limited to the processing of drilling fluid in an oil field environment, but is equally applicable to any application involving the control of fluid flow and the protection of surfaces that may be eroded by the fluid flow and debris within the fluid flow.

Since other modifications, changes, and substitutions are intended in the foregoing disclosure, it is appropriate that the appended claims be construed broadly and in a manner consistent with the scope of the invention.

What is claimed is:

1. A trim insert for a choke assembly, the choke assembly including a body, a sleeve insert, and a downstream trim component, the body including an upper body section having an upper body orifice, a discharge channel, and a shoulder, the upper body orifice and the discharge channel in coaxial alignment, the upper body orifice having an orifice diameter, the discharge channel having a channel diameter smaller than the orifice diameter thereby forming the shoulder, the sleeve insert retained within the upper body orifice such that a gap is defined between a second sleeve end and the shoulder, the downstream trim component retained within the discharge channel, the trim insert comprising:

a tubular member having a first end, a second end, and a flange intermediate the first end and the second end;

the first end positioned within the upper body orifice and having first end inner diameter sufficient to stop flow when a shuttle is in a closed position and a first end outer diameter sufficient to fit within the second sleeve end;

the flange having a flange outer diameter sufficient to fit within the upper body orifice and sufficient to retain the tubular member between the second sleeve end and the shoulder; and the second end sealingly retained within the discharge channel and having a second end outer diameter sufficient to fit within the discharge channel and sufficient to retain the tubular member against the adjacent downstream trim component.

2. The device of claim 1, wherein said flange has a flange thickness sufficient to withstand shear force when the shuttle is in the closed position.

3. The device of claim 2, wherein the tubular member has a flange reinforcement section immediately adjacent the flange and extending from the flange toward the second end.

4. The device of claim 1, wherein the tubular member has a circumferential groove between the flange and the second end; and the circumferential groove has a groove depth and a groove width sufficient to accommodate a seal ring.

5. The device of claim 4, wherein the tubular member has a tapered section between the circumferential groove and the second end.

6. The device of claim 1, wherein the tubular member is constructed of an erosion resistant material.

7. The device of claim 6, wherein the erosion resistant material is selected from the group consisting of: tungsten carbide, stainless steel, ceramic, and hardened steel.

8. The device of claim 1, wherein the tubular member further comprises:

an inner surface and an outer surface; and a wear-resistant coating adhered to the inner surface and the outer surface.

9. A choke assembly comprising:

a body including an upper body section having an upper body orifice, a discharge channel and a shoulder;

the upper body orifice and the discharge channel in coaxial alignment;

the upper body orifice having an orifice diameter;

the discharge channel having a channel diameter smaller than the orifice diameter thereby forming the shoulder;

a sleeve insert retained within the upper body orifice such that a gap is defined between a second sleeve end and the shoulder;

a downstream trim component retained within the discharge channel;

a shuttle subassembly including a linearly displaceable shuttle movable to a closed position, wherein flow to the discharge channel is stopped;

a flanged static trim component having a substantially constant inner diameter, a first end, a second end, and a flange intermediate the first end and the second end;

the first end positioned within the upper body orifice and having first end inner diameter and a first end outer diameter sufficient to provide a seat for the shuttle in the closed position;

said first end outer diameter sufficient to fit within the second sleeve end;

the flange having a flange outer diameter sufficient to fit within the upper body orifice and sufficient to retain the tubular member between the second sleeve end and the shoulder; and the second end sealingly retained within the discharge channel and having a second end outer diameter sufficient to fit within the discharge channel and sufficient to retain the tubular member against the adjacent downstream trim component.

10. The assembly of claim 9, wherein said flange has a flange thickness sufficient to withstand shear force when the shuttle is in the closed position.

11. The device of claim 10, wherein the tubular member has a flange reinforcement section immediately adjacent the flange and extending from the flange toward the second end.

12. The assembly of claim 9, further comprising:

a seal ring between the tubular member and the discharge channel; and the seal ring being positioned between the flange and the second end.

13. The assembly of claim 12, wherein the tubular member has a circumferential groove between the flange and the second end;

the circumferential groove having a groove depth and a groove width sufficient to accommodate the seal ring.

14. The assembly of claim 13, wherein the tubular member has a tapered section between the circumferential groove and the second end.

15. The assembly of claim 12, wherein the discharge channel has an annular groove formed therein;

the annular groove having a groove depth and a groove width sufficient to accommodate the seal ring; and the annular groove positioned such that the seal ring forms a seal with the tubular member between the flange and the second end.

16. The assembly of claim 9, wherein the tubular member is constructed of an erosion resistant material.

17. The assembly of claim 16, wherein the erosion resistant material is selected from the group consisting of: tungsten carbide, hardened steel, ceramic, and stainless steel.

18. The assembly of claim 17, wherein the tubular member further comprises:

an inner surface and an outer surface; and a wear-resistant coating adhered to the inner surface and the outer surface.

19. The assembly of claim 9, wherein the tubular member further comprises:

an inner surface and an outer surface; and a wear-resistant coating adhered to the inner surface and the outer surface.

* * * * *